United States Patent

Koyama et al.

Patent Number: 5,157,062
Date of Patent: Oct. 20, 1992

[54] THERMOPLASTIC RESIN COMPOSITION

[75] Inventors: Teruhisa Koyama; Shinji Date, both of Niihama, Japan

[73] Assignee: Sumitomo Chemical Company, Limited, Osaka, Japan

[21] Appl. No.: 769,738

[22] Filed: Oct. 2, 1991

[30] Foreign Application Priority Data

Oct. 3, 1990 [JP] Japan .................. 2-267297

[51] Int. Cl.$^5$ ............................................. C08K 5/41
[52] U.S. Cl. ................................................ 524/166
[58] Field of Search ........................................ 524/166

[56] References Cited

U.S. PATENT DOCUMENTS 4,873,277 10/1989 Boutni .................................. 524/166

FOREIGN PATENT DOCUMENTS 2336097 2/1975 Fed. Rep. of Germany ...... 524/166
1178546 12/1987 Japan .
1-97552 8/1989 Japan .
62288655 12/1989 Japan .

Primary Examiner—Paul R. Michl
Assistant Examiner—Olga Asinovsky
Attorney, Agent, or Firm—Birch, Stewart, Kolasch and Birch

[57] ABSTRACT

A thermoplastic resin composition containing (A) 100 parts by weight of a glutarimide copolymer having 5 to 100% by mole of glutarimide units and 95 to 0% by mole of ethylenically $\alpha,\beta$-unsaturated monomer units, and (B) 0.3 to 10 parts by weight of an alkali metal alkylsulfonate of the following formula:

$$R-SO_3X \qquad (I)$$

wherein R represents a $C_8-C_{22}$ alkyl group, and X represents an alkali metal, which has good antistatic properties as well as improved heat resistance.

15 Claims, No Drawings

THERMOPLASTIC RESIN COMPOSITION

BACKGROUND OF THE INVENTION

1. Field of the Invention

The present invention relates to a thermoplastic resin composition which has an excellent antistatic property and heat resistance.

2. Description of the Related Art

An acrylic resin is widely used as a molding material having good heat resistance and mechanical properties.

While the acrylic resin has a good electrical insulating property, it is easily statically charged so that the surface of a molded article tends to have deteriorated gloss or poor appearance. Thereby, the commercial value of the molded article is greatly reduced.

To overcome the above problem, it was proposed to add an antistatic agent to the acrylic resin (see Japanese Patent Kokai Publication No. 197552/1990).

Even though the antistatic property may be imparted by the addition of an antistatic agent, the outstanding heat resistance of the acrylic resin may decrease drastically.

For this reason, the antistatic agent is used in an amount as small as possible. However, the addition of such a small amount of the antistatic agent may not impart the antistatic property to the acrylic resin satisfactorily and thus a acrylic resin molded article with a satisfactory antistatic property cannot be obtained.

SUMMARY OF THE INVENTION

An object of the present invention is to provide a thermoplastic resin composition having a satisfactory antistatic property together with heat resistance.

According to the present invention, there is provided a thermoplastic resin composition comprising (A) 100 parts by weight of a glutarimide copolymer which comprises 5 to 100% by mole of glutarimide units and 95 to 0% by mole of ethylenically $\alpha,\beta$-unsaturated monomer units, and (B) 0.3 to 10 parts by weight of an alkali metal alkylsulfonate of the following formula:

$$R-SO_3X \quad (I)$$

wherein R represents a $C_8$-$C_{22}$ alkyl group, and X represents an alkali metal.

DETAILED DESCRIPTION OF THE INVENTION

The glutarimide unit of the glutarimide copolymer to be used in the present invention may be represented by the following formula:

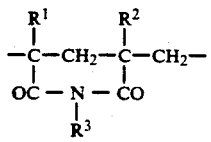
(II)

wherein $R^1$ and $R^2$ independently represent hydrogen atoms or methyl groups, and $R^3$ represents a hydrogen atom or a $C_1$-$C_{20}$ aliphatic, aromatic or alicyclic hydrocarbon group.

When $R^3$ is a hydrogen atom or a methyl group, the composition shows particularly outstanding heat resistance. When $R^3$ is a cyclohexyl group, the composition has low hygroscopicity.

The content of the glutarimide units in the glutarimide copolymer (A) is from 5 to 100% by mole, preferably at least 20% by mole. If the content of the glutarimide units is less than the above lower limit, the composition may not have sufficient heat resistance.

Examples of the ethylenically $\alpha,\beta$-unsaturated monomer units of the glutarimide copolymer are monomer units derived from, for example, (meth)acrylate esters, (meth)acrylic acid, styrene, $\alpha$-methylstyrene, vinyltoluene, chlorostyrene, acrylonitrile and so on.

Specific examples of the (meth)acrylate esters are methyl (meth)acrylate, ethyl (meth)acrylate, propyl (meth)acrylate, n-butyl (meth)acrylate, isobutyl (meth)acrylate, tert.-butyl (meth)acrylate, dodecyl (meth)acrylate, cyclohexyl (meth)acrylate, norbornyl (meth)acrylate, 2-ethylhexyl (meth)acrylate, benzyl (meth)acrylate unit and so on.

These monomer units may be used independently or as a mixture of two or more of them.

The content of such monomer units in the glutarimide copolymer is from 95 to 0% by mole.

The weight average molecular weight of the glutarimide copolymer is normally from 40,000 to 500,000, preferably from 40,000 to 200,000.

If the molecular weight is lower than 40,000, the molded article of the composition will have poor mechanical strength. If it exceeds 500,000, molding workability will suffer.

To produce the glutarimide copolymer (A) of the present invention, any of the known methods such as the methods described in Japanese Patent Publication No. 38404/1985 and Japanese Patent Kokai Publication No. 89705/1987 can be used.

In one method, a homopolymer or a copolymer comprising (meth)acrylic acid or a (meth)acrylate as the ethylenically $\alpha,\beta$-unsaturated monomer unit is heated melted and then an imidizing agent is added, mixed, and reacted to obtain the glutarimide copolymer.

Examples of the imidizing agent are ammonia, methylamine, ethylamine, butylamine, hexylamine, octylamine, nonylamine, decylamine, benzylamine, cyclohexylamine, aniline, halogenated aniline, urea, dimethylurea and so on.

As the alkali metal alkylsulfonate (B) to be used in the present invention, one having 8 to 22, preferably 12 to 18, carbon atoms in the alkyl group is preferred. When the carbon number is less than 8 or more than 22, the surface of the molded article tends to be sticky.

As the alkaline metal, lithium, sodium and potassium are preferred.

The resin composition of the present invention comprises 100 parts by weight of the glutarimide copolymer (A) and 0.3 to 10 parts by weight, preferably 0.5 to 8 parts by weight, of the alkali metal alkylsulfonate (B).

If the amount of alkali metal alkylsulfonate (B) is less than 0.3 weight part, the composition may not have a sufficient antistatic property. On the other hand, if it exceeds 10 parts by weight, the surface of the molded article will be sticky.

In addition to the above components, the resin composition may contain at least one other antistatic agent such as glycerin aliphatic acid esters, aliphatic acid alkylene oxide adducts, glycerin aliphatic acid ester alkylene oxide adducts, alkali metal alkylbenzenesulfonates, polyethyleneglycol-aliphatic acid ester-alkali metal sulfonate and so on.

To prepare the composition from the copolymer (A) and the alkali metal alkylsulfonate (B), any of the conventional methods may be used.

For example, a method comprising mixing solutions of each of the components and then evaporating off the solvent, or pouring the mixture into a non-solvent to precipitate the product or a method comprising blending the components in a molten state may be employed. To melt and knead the components, a conventional single-screw or twin-screw extruder, or kneader, may be used. Alternatively, direct blending during a melt-processing operation such as injection molding or extrusion molding process can be used also.

The thermoplastic resin composition of the present invention may contain known additives, for example, an antioxidant such as a hindered phenol type antioxidant, a phosphorus base antioxidant or a sulfur base antioxidant; an anti-weathering agent such as a ultraviolet-light absorber or a hindered amine type light stabilizer; a lubricant; a flame retardant; a coloring agent; or a pigment. Further, according to the final use of the composition, reinforcing fibers such as glass fibers and so on, and inorganic fillers and so on may be added.

The antistatic thermoplastic resin composition of the present invention not only has an outstanding antistatic property, but also improved heat resistance, including thermal deformation temperature. Thus, the thermoplastic resin composition of the present invention can find various applications that utilize its properties such as hoods of lighting equipment exterior displaying materials, and display material for information and guides, and so on.

PREFERRED EMBODIMENTS OF THE INVENTION

The present invention will be explained further in detail by following Examples, in which parts are by weight unless otherwise indicated.

The following test methods were used in the:

Thermal deformation temperature

The test is conducted with a load of 18.6 kg/cm$^2$, according to ASTM D-648.

Inherent surface resistivity

After conditioning a test sample for 3 days at 23° C. and 50% R.H., the resistivity is measured in the same atmosphere with a Super Insulation meter (Model SM-10E, a product of Toa Denpa Kogyo Kabushikikaisha).

Half life of static voltage

After conditioning a test sample for 3 days at 23° C. and 50%R.H., a voltage (10 KV) is applied on the test sample with a static onestometer (a product of Shishido Shokai Kabushikikaisha). Then, the applied voltage is reduced to zero, and the time required for the voltage charge to drop down to half of its original value is measured.

Surface condition of molded product

The condition of the surface of the molded article is examined by touching the surface with the fingers, and evaluated as "Good" or "Bad".

Examples 1-10 and Comparative Examples 1-3

Glutarimide copolymer (KAMAX ®T-240 manufactured by Rohm & Haas, the content of the glutarimide units =75% by mole) was compounded with various types of metal alkylsulfonates and other antistatic agents in the amounts shown in the following Table and kneaded at 240° C. for 5 minutes at a rotor speed of 100 rpm in a Labo-Plast Mill (a product of Toyo Seiki Seisakusho Kabushikikaisha).

The resulting blend was molded using a thermal compression molding device at a molding temperature of 240 ° C. a molding pressure of 150 kg/cm$^2$ to form a flat plate having a thickness of 3 mm. Test samples were cut out from the plate, and their properties were evaluated. The results are shown in the Table.

Comparative Example 4

Experiments were carried out in the same manner as in Example 5 except using, as the glutarimide copolymer, a general purpose methacrylate resin (Sumipex-B-MHO, a product of Sumitomo Chemical Co. Ltd.), and the properties were evaluated.

The results are shown in the Table.

TABLE

| Example No. | Alkali metal alkylsulfonate Compound (parts) | Other antistatic agent Compound (parts) | Thermal deformation temperature (°C.) | Inherent surface resistivity (ohm) | Half life of charge voltage (seconds) | Surface condition of molded product |
|---|---|---|---|---|---|---|
| 1 | Na 1-decanesulfonate (5) | — | 115 | $1.4 \times 10^{13}$ | >120 | Good |
| 2 | Na Cetylsulfonate (0.5) | — | 109 | $1.3 \times 10^{13}$ | >120 | Good |
| 3 | Na Cetylsulfonate (1) | — | 109 | $2.2 \times 10^{12}$ | 41 | Good |
| 4 | Na Cetylsulfonate (2) | — | 110 | $3.6 \times 10^{10}$ | 1 | Good |
| 5 | Na Cetylsulfonate (5) | — | 109 | $1.5 \times 10^9$ | <1 | Good |
| 6 | Na Cetylsulfonate (8) | — | 108 | $1.1 \times 10^9$ | <1 | Good |
| 7 | Na Cetylsulfonate (3) | Polyethyleneglycol acetate (2) Na sulfonate | 108 | $6.7 \times 10^{11}$ | 3 | Good |
| 8 | Na Cetylsulfonate (3) | Na laurylbenzene (2) sulfonate | 110 | $1.8 \times 10^{10}$ | <1 | Good |
| 9 | Na Cetylsulfonate (3) | Stearic acid (2) monoglyceride | 106 | $3.3 \times 10^{10}$ | <1 | Good |
| 10 | Na 1-Octadecylsulfonate (5) | — | 109 | $9.5 \times 10^{11}$ | 52 | Good |
| Comp. Example No. | | | | | | |
| C. 1 | Na 1-Hexanesulfonate (5) | — | 114 | $1.8 \times 10^{13}$ | >120 | Bad |
| C. 2 | Na Cetylsulfonate (0.2) | — | 112 | $2.0 \times 10^{14}<$ | >120 | Good |

TABLE-continued

| | Alkali metal alkylsulfonate Compound (parts) | Other antistatic agent Compound (parts) | Thermal deformation temperature (°C.) | Inherent surface resistivity (ohm) | Half life of charge voltage (seconds) | Surface condition of molded product |
|---|---|---|---|---|---|---|
| C. 3 | Na Cetylsulfonate (15) | — | 106 | $7.5 \times 10^8$ | <1 | Bad |
| C. 4 | Na Cetylsulfonate (5) | — | 81 | $2.0 \times 10^9$ | <1 | Good |

What is claimed is:

1. A thermoplastic resin composition comprising:
   (A) 100 parts by weight of a glutarimide copolymer which comprises 5 to 100% by mole of glutarimide units and 95 to 0% by mole of ethylenically $\alpha,\beta$-unsaturated monomer units; and
   (B) 0.3 to 10 parts by weight of an alkali metal alkylsulfonate of the following formula:

$$R-SO_3X \qquad (I)$$

wherein R represents a $C_8-C_{22}$ alkyl group, and X represents an alkali metal.

2. The thermoplastic resin composition according to claim 1, wherein said glutarimide unit is represented by the formula:

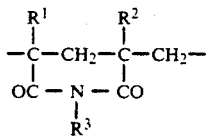

(II)

wherein $R^1$ and $R^2$ independently represent hydrogen atoms or methyl groups, and $R^3$ represents a hydrogen atom or a $C_1-C_{20}$ aliphatic, aromatic or alicyclic hydrocarbon group.

3. The thermoplastic resin composition according to claim 1, wherein the content of said glutarimide units in said glutarimide copolymer (A) is at least 20% by mole.

4. The thermoplastic resin composition according to claim 1, wherein said ethylenically $\alpha,\beta$-unsaturated monomer units are derived from (meth)acrylate esters, (meth)acrylic acid, styrene, $\alpha$-methylstyrene, vinyltoluene, chlorostyrene, or acrylonitrile.

5. The thermoplastic resin composition according to claim 4, wherein said (meth)acrylate esters are at least one member selected from the group consisting of methyl (meth)acrylate, ethyl (meth)acrylate, propyl meth(acrylate), n-butyl (meth)acrylate, isobutyl (meth)acrylate, tert.-butyl (meth)acrylate, dodecyl (meth)acrylate, cyclohexyl (meth)acrylate, norbornyl (meth)actylate, 2-ethylhexyl (meth)acrylate, and benzyl (meth)acrylate.

6. The thermoplastic resin composition according to claim 1, wherein the weight average molecular weight of said glutarimide copolymer (A) is from 40,000 to 500,000.

7. The thermoplastic resin composition according to claim 6, wherein the weight average molecular weight of said glutarimide copolymer (A) is from 40,000 to 200,000.

8. The thermoplastic resin composition according to claim 1, wherein said glutarimide copolymer (A) is produced by heating and melting a homopolymer or a copolymer comprising (meth)acrylic acid or a (meth)acrylate, and then adding, mixing, and reacting an imidizing agent to obtain said glutarimide copolymer.

9. The thermoplastic resin composition according to claim 8, wherein said imidizing agent is selected from the group consisting of ammonia, methylamine, ethylamine, butylamine, hexylamine, octylamine, nonylamine, decylamine, benzylamine, cyclohexylamine, aniline, halogenated aniline, urea, and dimethylurea.

10. The thermoplastic resin composition according to claim 1, wherein R of said alkali metal alkylsulfonate (B) represents a $C_{12}-C_{18}$ alkyl group.

11. The thermoplastic resin composition according to claim 1, wherein said alkali metal of said alkali metal alkylsulfonate (B) is selected from the group consisting of lithium, sodium, and potassium.

12. The thermoplastic resin composition according to claim 1, wherein said alkali metal alkylsulfonate (B) is present in an amount of from 0.5 to 8 parts by weight.

13. The thermoplastic resin composition according to claim 1, further comprising at least one antistatic agent selected from the group consisting of glycerin aliphatic acid esters, aliphatic acid-alkylene oxide adducts, glycerin aliphatic acid ester-alkylene oxide adducts, alkali metal alkylbenzenesulfonates, and polyethyleneglycol-aliphatic acid ester-alkali metal sulfonate.

14. The thermoplastic resin composition according to claim 1, further comprising an additive selected from the group consisting of an antioxidant, an anti-weathering agent, a lubricant, a flame retardant, a coloring agent, a pigment, reinforcing fibers, and an inorganic filler.

15. The thermoplastic resin composition according to claim 14, wherein said antioxidant is selected from the group consisting of a hindered phenol type antioxidant, a phosphorus base antioxidant, and a sulfur base antioxidant; said anti-weathering agent is selected from the group consisting of an ultraviolet-light absorber and a hindered amine type light stabilizer; and said reinforcing fibers are glass fibers.

* * * * *